United States Patent
Lambauer et al.

(10) Patent No.: US 7,182,588 B2
(45) Date of Patent: Feb. 27, 2007

(54) DEVICE FOR THE CONTINUOUS PRODUCTION OF A STRIP OF DOUGH

(75) Inventors: Peter Lambauer, Feldkirchen (AT); Gerhard Schmolli, Hirschegg (AT)

(73) Assignee: Koenig Maschinen Gesellschaft m.b.H., Graz (AT)

( * ) Notice: Subject to any disclaimer, the term of this patent is extended or adjusted under 35 U.S.C. 154(b) by 280 days.

(21) Appl. No.: 10/499,095

(22) PCT Filed: Dec. 5, 2002

(86) PCT No.: PCT/AT02/00343

§ 371 (c)(1),
(2), (4) Date: Jun. 16, 2004

(87) PCT Pub. No.: WO03/051127

PCT Pub. Date: Jun. 26, 2003

(65) Prior Publication Data

US 2005/0170031 A1    Aug. 4, 2005

(30) Foreign Application Priority Data

Dec. 17, 2001 (AT) .............................. A 1976/2001

(51) Int. Cl.
*A21C 3/02* (2006.01)

(52) U.S. Cl. ........................ 425/101; 425/230; 425/335; 425/363; 426/502

(58) Field of Classification Search ................ 425/101, 425/230, 335, 363, 367, 812; 426/502
See application file for complete search history.

(56) References Cited

U.S. PATENT DOCUMENTS

| | | | | |
|---|---|---|---|---|
| 1,509,455 A | * | 9/1924 | Valenta | 425/363 |
| 2,145,550 A | * | 1/1939 | Loose | 425/363 |
| 2,246,106 A | * | 6/1941 | Patt | 425/223 |
| 2,814,260 A | * | 11/1957 | Morgan | 425/363 |
| 3,748,073 A | * | 7/1973 | Lankford et al. | 425/367 |
| 4,276,317 A | * | 6/1981 | Hayashi | 426/502 |
| 4,597,731 A | * | 7/1986 | Suzuki | 425/204 |

(Continued)

FOREIGN PATENT DOCUMENTS

DE          838281       *   5/1952

(Continued)

*Primary Examiner*—James P. Mackey
(74) *Attorney, Agent, or Firm*—Townsend and Townsend and Crew LLP

(57) ABSTRACT

The invention relates to a device for the continuous production of a strip (6) of dough from a mass (5) of dough, the width of said strip being a multiple of its thickness. The inventive device comprises at least one pair of opposite, interspaced, longitudinal guiding elements (8, 9) for guiding the dough. The dough passes through the gap (15) formed between the guiding elements and is guided by said guiding elements (8, 9), which are driven in opposing rotatory directions, from an intake end (16) of the device to an outlet end (17) of the same. At least one of the guiding elements (8, 9) is profiled on its circumference with a plurality of grooves (20) extending side by side, perpendicularly to the longitudinal direction of the respective guiding element (8, 9). Said grooves (20) assist the transport of the dough through the gap (15) and enable the bubbles in the dough (5) to be maintained.

15 Claims, 3 Drawing Sheets

U.S. PATENT DOCUMENTS

| | | | |
|---|---|---|---|
| 4,996,915 A * | 3/1991 | Morikawa et al. | 425/335 |
| 6,117,472 A * | 9/2000 | Yonemaru et al. | 426/502 |
| 6,126,431 A * | 10/2000 | Hayashi | 425/363 |
| 6,155,814 A * | 12/2000 | Hayashi | 425/363 |
| 6,171,629 B1 * | 1/2001 | Morikawa | 426/502 |
| 6,322,345 B1 * | 11/2001 | Zaltron | 425/363 |

FOREIGN PATENT DOCUMENTS

| | | | |
|---|---|---|---|
| DE | 1048843 | * | 1/1959 |
| DE | 2250569 | * | 4/1974 |
| EP | 599326 | * | 6/1994 |
| GB | 507402 | * | 6/1939 |
| SU | 549127 | * | 5/1977 |
| WO | WO01/08497 | * | 2/2001 |

* cited by examiner

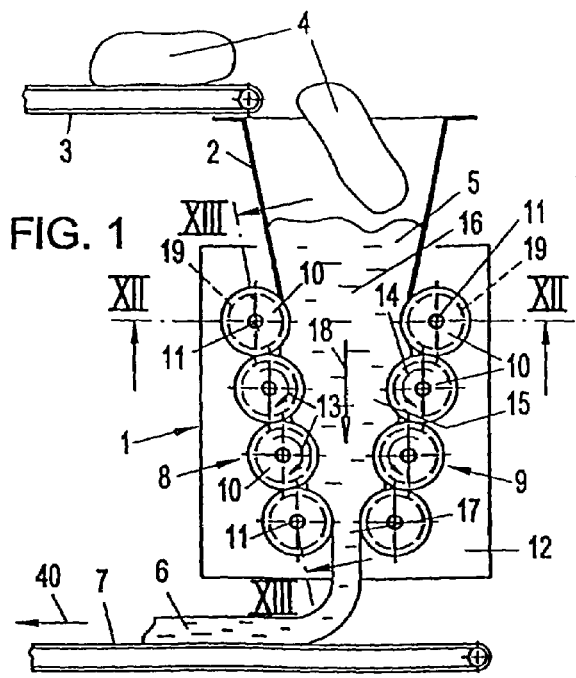

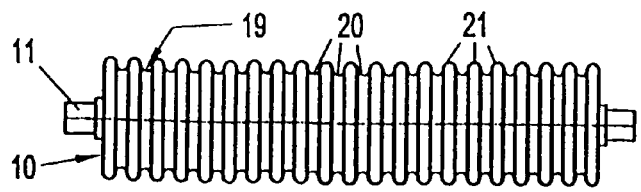
FIG. 6
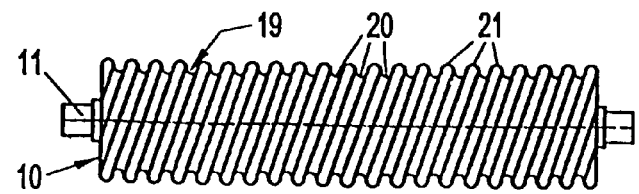
FIG. 7
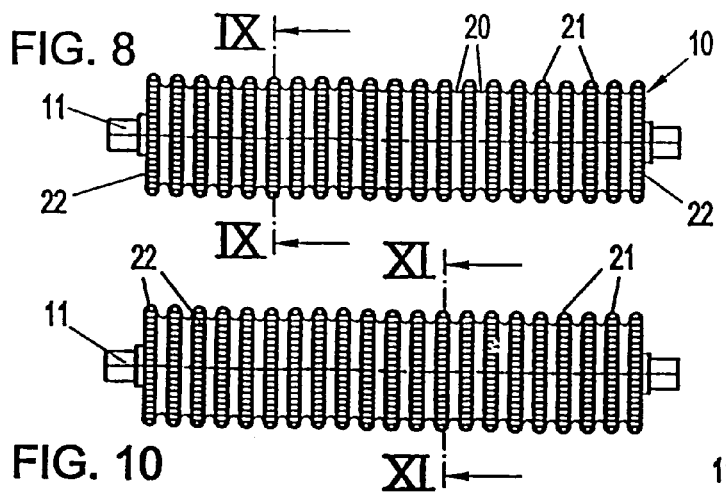
FIG. 8
FIG. 9
FIG. 10
FIG. 11
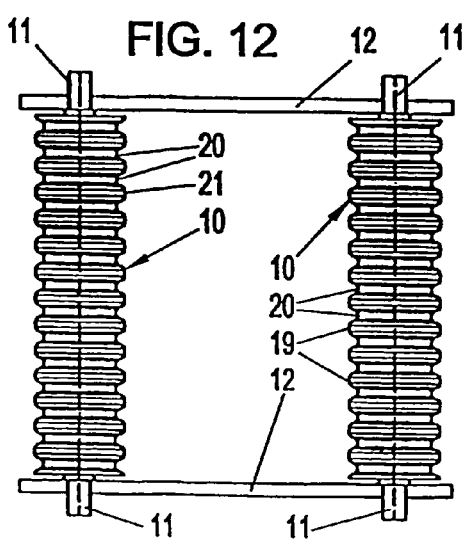
FIG. 12
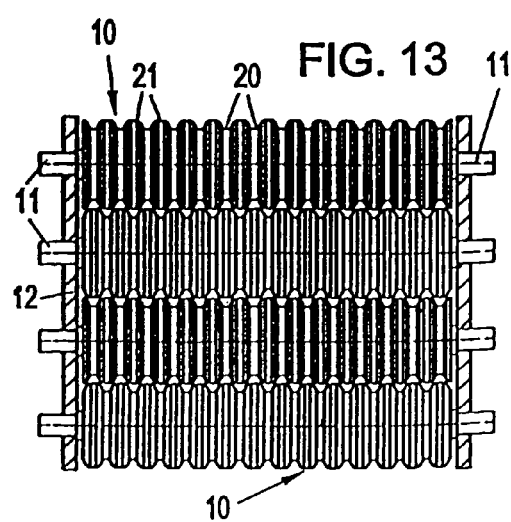
FIG. 13

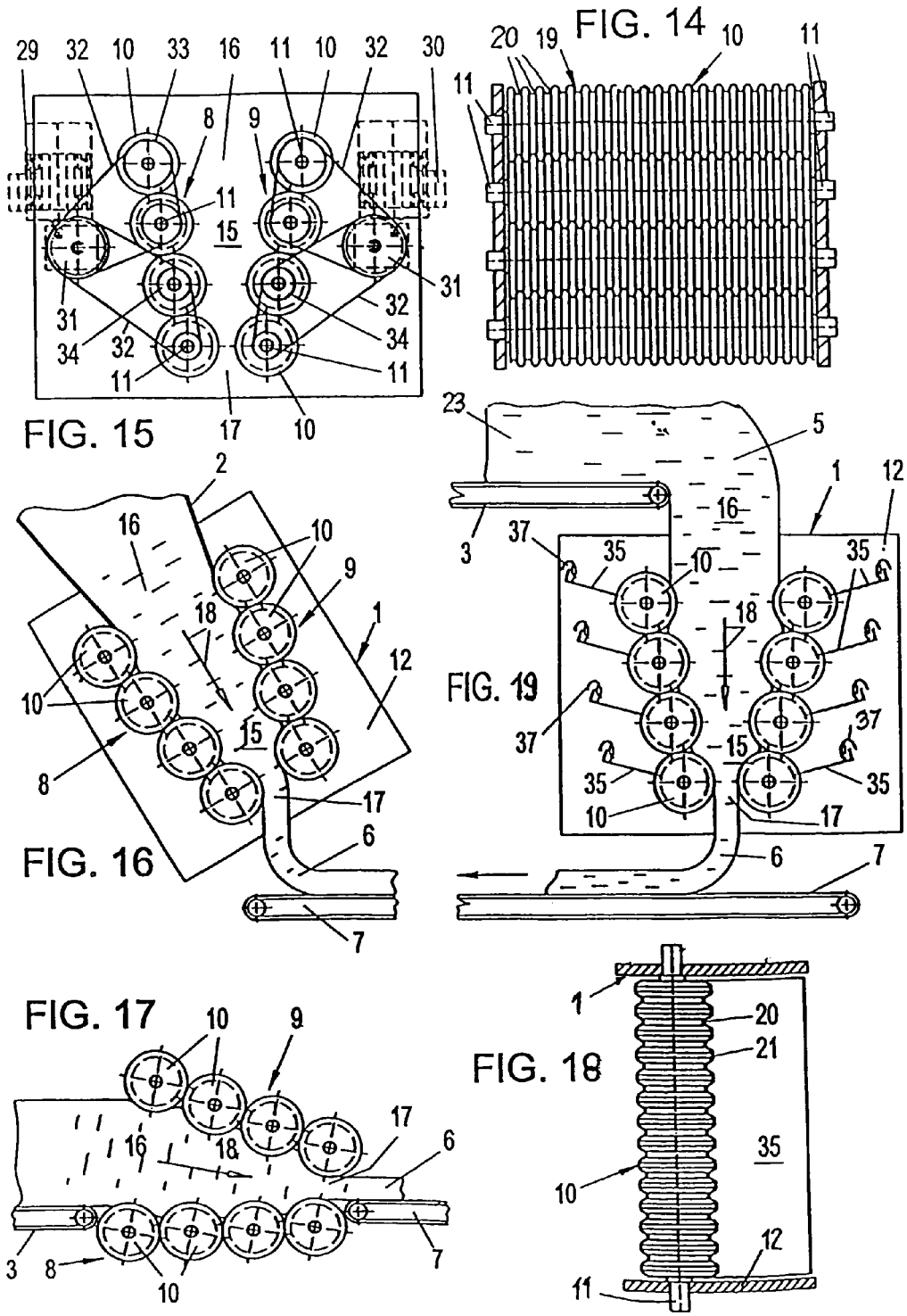

DEVICE FOR THE CONTINUOUS PRODUCTION OF A STRIP OF DOUGH

The invention refers to an apparatus for continuous producing of a dough strip, the width thereof is a multiple of its thickness, from a dough mass, with at least one pair of oppositely disposed elongated guiding elements for the dough, which guiding elements are formed by rollers and are adjustably spaced apart from each other, wherein the dough passes through the gap formed by this spacing and is guided by the rollers driven in opposite direction of revolution from an intake end of the apparatus to an outlet end thereof, and wherein at least one of the rollers is provided with a profile on its periphery, which profile is formed by a plurality of grooves extending side-by-side crosswise the longitudinal direction of the respective roller, which grooves enhance conveying the dough through the gap.

For producing of numerous bakery products it is necessary to transform a dough mass supplied continuously or portion-wise, for example from a kneader, into a continuous dough band, the thickness thereof as a rule is small and amounts only a small fraction of the band-width. This dough band is then conveyed to further processing apparatus, for example devices, which cut the broad band into small strips, which are then separated from each other by spreading bands and are conveyed to forming apparatus of different kind. When forming this continuous dough band the dough must be treated carefully, so that baking products of satisfactory quality are obtained. In particular, bubbles, in particular fermentation bubbles and air, present in the dough must be preserved and squeezing of the dough must be avoided.

An apparatus of the initially described kind is known from U.S. Pat. No. 2,145,550 A for producing very thin dough sheets.

Further it is known from EP 744 126 B to provide on both sides of the gap a roller set each, the rollers thereof having a profile which is formed by a polygonal cross-section of the rollers. The latter apparatus can indeed produce a dough band of substantially continuous thickness, however, it processes the dough not sufficiently careful, because the guiding elements delimiting the gap are moved periodically towards or away from each other. When the oppositely disposed guiding elements get nearer to each other, the dough is squeezed and bubbles present in the dough can only to a limited extent evade to above or to below, and not at all within the initially described known apparatus.

The invention has at its object to improve an apparatus of the initially described kind so that the dough is processed more carefully and, in particular, bubbles of different kind, present in the dough, are preserved. The invention solves this task in that the gap is delimited by two roller sets each one thereof having at least two rollers and that the width of the gap measured between oppositely disposed rollers decreases from the intake end towards the outlet end, wherein the rollers of each roller set have a circumferential speed that increases towards the outlet end corresponding to narrowing of the gap and wherein on each roller set a flow-out of the dough between neighbouring rollers is avoided so that the grooves constitute an evading possibility for bubbles present in the dough, however keep the bubbles within the dough. This evading possibility exists at first in longitudinal direction of the gap, that is in direction from the intake end of the apparatus to the outlet end thereof, but in addition thereto also side-wise, that is in longitudinal direction of the rollers, corresponding to the designing and the run of the grooves. It has been shown that thereby a particular carefully dough band production is possible so that a dough band of high dough quality can be supplied to further dough processing. The possibility of adjusting the gap width enables one to extensively adapt to different qualities of the dough to be processed and the circumferential speed of the rollers which increases towards the outlet end of the gap avoids squeezing the dough caused by narrowing the gap.

A further advantage of the subject of the invention is that the periodic motion of the rollers across to the longitudinal direction of the gap, present in the above mentioned known construction, is omitted, what contributes to simplifying the construction and thereby to saving of costs.

From EP 599 326 A1, indeed rollers acting onto the dough are known, which are provided with grooves extending perpendicularly to the longitudinal direction of the rollers. However, these rollers are not driven and they serve for producing a structure on the surface of the dough band. The rollers of the roller pair disposed at both sides of the dough band are so near each other disposed, that the profiles formed by the grooves of the two rollers mate into each other like a toothing. Such a device does not allow an evading possibility for bubbles present in the dough.

According to a preferred embodiment of the invention, the grooves extend parallel to each other or, respectively, closed in itself around the periphery of the guiding element. A particular simple and clearly arranged construction results, when the grooves extend perpendicular to the longitudinal direction of the guiding element, however, also thread-like extending grooves meet the initially described requirements.

According to a further embodiment of the invention slots can be provided in at least some of the projections existing between neighbouring grooves, the direction of the slots crossing the direction of the grooves. These slots constitute an additional free space for evading of gas-bubbles and in addition they avoid that the dough slides through in longitudinal direction of the gap when this longitudinal direction extends obliquely or vertically.

Although in the most cases the gap will so disposed that its axis extends vertically, the invention is not limited thereto, on the contrary, the gap can extend obliquely or horizontally from the intake end towards the outlet end.

The rollers may have different profiles and, respectively, or grooves and, respectively, or sizes and the guiding elements can be elements of devices which apply substances onto the dough, for example oil, a flouring, a dusting and the like.

Further features and advantages of the invention result from the description of exemplative embodiments schematically shown in the drawings.

FIG. 1 shows a first exemplative embodiment of the invention in a longitudinal section.

FIG. 2 shows an embodiment in which the supplied dough strand is covered with flour.

FIG. 3 shows the adjustment of the width of a roller gap, which is delimited by two roller sets.

FIGS. 4 and 5 show variants to the embodiment of FIG. 3.

FIG. 6 shows the shape of the grooves on a roller.

FIG. 7 shows a variant to the embodiment of FIG. 6.

FIGS. 8 and 10 show further embodiment variants, and the

FIGS. 9 and 11 are sections taken along the lines IX to IX of FIG. 8 or XI to XI of FIG. 10, respectively.

FIG. 12 shows in an enlarged scale a section taken along the line XII to XII of FIG. 1.

FIG. 13 shows in a section taken along the line XIII to XIII of FIG. 1 an embodiment variant.

FIG. 14 is a variant of the embodiment of FIG. 13 with mating roller grooves.

FIG. 15 shows an embodiment for driving the rollers with different revolution speeds.

FIGS. 16 and 17 show embodiment variants having an obliquely directed or, respectively, substantially horizontally extending roller gap.

FIG. 18 shows in a section an embodiment having strippers related to the rollers.

FIG. 19 shows an embodiment having oiled rollers.

According to the embodiment of FIG. 1, the apparatus has a framework 1 having on top a hopper 2 for filling in the dough to be processed. According to this embodiment, this dough is supplied in form of dough portions 4 by means of a conveyor belt 3. Within the hopper 2, these dough portions 4 form a dough mass 5 from which a thin dough strip 6 is formed, which is laid down onto a conveying-off belt 7 and is conveyed off by this conveyor belt 7 in direction of the arrow 40. Transforming of the dough mass 5 in a thin dough strip 6 is made by two sets of guiding elements 8, 9. Each guiding element set is formed by four elongated rollers 10, which are bearingly supported for rotation with parallel axes 11 on two side walls 12 of the framework 1 which are disposed at the front ends of the rollers 10. These rollers 10 form a dough strip 6 having a width that is a multiple of its thickness. The rollers 10 of each guiding element set are driven in the same direction, however for the two guiding roller sets oppositely in direction of the arrows 13, 14. All rollers 10 of the two sets of guiding elements 8, 9 are of the same size, however having so disposed axes 11 that the gap 15 between two opposite rollers 10 narrows from the intake end 16 of the two guiding element sets 8, 9 towards the outlet end 17 like a hopper, however, the width of the processed dough strip 6, when measured in direction of the axes 11 of the rollers 10 remains constant. By the said rotation of the rollers 10 in direction of the arrows 13 or 14 the dough is conveyed through the gap 15 in direction of the arrow 18. This conveying is assisted by providing the rollers on their periphery with a profile 19 (FIG. 6) which is formed by a plurality of grooves 20 extending side-by-side crosswise the longitudinal direction, that means across the direction of the axes 11 of the rollers 10. Within the embodiment of FIG. 6, these grooves 20 extend parallel to each other around the periphery of the roller 10 in form of closed rings disposed in planes extending perpendicularly to the axis 11 of the roller 10. These grooves constitute at the same time a space into which bubbles of fermentation gases or air present in the processed dough mass 5 can evade, which bubbles should be preserved in the sense of a high dough quality. Therefore, squeezing of the dough and destroying of these gas-bubbles is avoided. The evading spaces formed by the grooves 20 allow as well a side-wise evading of the gas-bubbles in direction of the axis 11 of the rollers 10, therefore, from the projections 1 delimiting the grooves 20 into the hollow spaces formed by the grooves 20, as an evading possibility in longitudinal direction of the gap 15, therefore in conveying direction 18 of the dough or opposite thereto, therefore along the ring-shaped hollow spaces formed by the grooves 20.

However, the grooves must not extend in planes disposed perpendicularly to the axis 11. As FIG. 7 shows also a thread-like arrangement of the grooves 20 is possible and is efficient in the sense of the invention.

A further assistance of the conveying action of the rollers 10 onto the dough 5 can be obtained by providing at least some of the projections 21 existing between neighbouring grooves 20 with slots 22 (FIG. 8) extending parallel to the axis 11 or also obliquely thereto. These slots 22 form the periphery of the projections 21 like a knurling by which the said additional conveying action is assisted and it is avoided that the dough slides between the rollers 10 in direction of the arrow 18.

As a rule, however, not compulsory, the rollers 10 of each set are so disposed that they just contact each other with their outermost periphery portions (FIG. 1). Thereby, a flow-out of the dough 5 between rollers 10 neighbouring each other is avoided. However, from this engaging arrangement is swerved, if the profile of the rollers 10 is not circular, and FIGS. 10 and 11 show an embodiment for this in which the projections 21 are also provided with slots 22 extending crosswise the peripheral direction. This embodiment shows a hexagonal cross-section of the projections 21, when seen in direction of the axis 11. Other suitable shapes of the cross-section are possible, in particular polygonal cross-sections having more than six sides or oval cross-sections. In the latter, a periodic narrowing or enlarging of the gap 15 existing between opposite rollers 10 occurs, when the axes 11 of the opposite rollers 10 are fixly bearingly supported and both opposing rollers 10 revolve with the same speed, are of the same size and the hills and dales of the oval roller cross-section meet each other. This could result in a periodic squeezing of the dough. In order to avoid this for an oval roller cross-section, the rotation of the rollers 10 can be so chosen that always a dale of the oval roller cross-section of the one roller 10 neighbours the gap 15, when for the other roller 10 the hill of the oval roller cross-section neighbours the gap 15. In such a manner an at least substantially constant width of the gap 15 between the two opposing rollers 10 can be ensured.

Supplying the dough to be processed must not be made in form of dough lumps 4, as this is shown in FIG. 1. However, it is possible to supply the dough to be processed in form of an already pre-formed dough sheet 23 (FIG. 19). The width of the gap 15 is adjustable in order to enable one to adapt to different dough qualities. For this, the axis 11 of the one roller 10 of the roller pair may be bearingly supported in cross pieces which are slideably disposed relative to the framework 1, an eccentric drive 26 being provided for this sliding and therefore for an adjustment of the gap. Such an adjustment of the effective width of the gap 15, of course, can also be made for sets of opposite rollers 8, 9. FIG. 3 shows an embodiment in which the hopper-shaped extending gap 15 is delimited by four pairs of rollers 10. The rollers 10 of the right guiding element set 9 are bearingly supported with their axes 11 on plates 27, and the plates are swivelable around the uppermost axis 11 relative to the framework 1. The adjustment is made by means of an eccentric drive 26.

FIG. 4 shows an embodiment variant for this, wherein only the lowermost roller 10 of the right roller set is adjustable for adjusting the width of the gap 15.

Whereas FIGS. 3 and 4 show an adjustment of the eccentric drive 26 by hand, by means of a hand lever 28, within the embodiment according to FIG. 5 a motor 29 is provided for adjustment of the eccentric drive 26, which motor is controlled in a suitable manner. Such a motor, of course, can be provided for each kind of the adjustment of the roller gap.

FIGS. 6 and 7 show a rounded profile of the projections 21, this profile, however, can also be flattened, as the section according to FIG. 12 shows. Further, the rollers of the guiding element sets 8, 9 and/or the rollers 10 being opposite with respect to the gap 15 must not be equal to each other, however, also rollers of different design can be combined with each other, in particular rollers of different diameters.

Further, it is also possible, as FIG. 13 shows, to dispose the grooves 20 of neighbouring rollers 10 displaced in direction of the roller axes 11, and within each embodiment different roller shapes can be combined with each other.

As FIG. 14 shows, the grooves 20 of neighbouring rollers 10 of a set 8 or 9 can be so constructed and the several axes 11 of neighbouring rollers 10 of this set can be disposed so near each other that there results a mating disposition of the grooves 20 or the projections 21 delimiting them. Thereby, also a self-cleaning of the rollers 10 is obtained.

Driving the rollers 10 for rotation can be obtained from a common motor by means of suitable gearings. FIG. 15, however, shows an embodiment variant in which an own motor 29 or 30 is provided for each one of the two roller sets 8, 9. Each motor 29 or 30 drives a drive chain wheel 31 from which chains 32 lead to drive pinions 33, 34, connected for common rotation with the axes 11 of the several rollers 10. This enables one in a simple manner to drive the several rollers of each roller set 8 or 9 with different revolution speed. For this, it is sufficient to give the driving pinions 33, 34 a different size. Suitably, the arrangement is so chosen, that the revolution speed of the 15 rollers 10 increases from the intake end 16 of the gap 15 towards its outlet end 17, and this corresponding to the narrowing of the cross-section of the gap 15. If desired, opposite rollers 10 can also have different revolution speeds.

In FIG. 15 the arrangement is so chosen, that the revolution speed of the rollers 10 of each roller set 8 or 9 increases stepwisely from up to down. However, the arrangement can also be so chosen, that, for example, the two uppermost drive pinions 33 of each roller set are of the same size and also the two lowermost drive pinions 34, wherein, however, the latter are smaller than the drive pinions 33. In such a manner a coarse stepwise increase of the revolution speed is obtained from up to down.

The apparatus must not be so constructed that the gap 15 remaining between the roller sets 8, 9 extends vertically or nearly vertical. However, it is possible to give this gap 15 also an inclined axis, as this is shown in FIG. 16. Also a construction according to FIG. 17 is possible, in which the intake end 16 and the outlet end 17 of the gap 15 have nearly or completely the same level. In such an embodiment, the dough to be processed is suitably supplied by means of a conveyor belt 3, whereas within the embodiment according to FIG. 16 also supplying by means of a hopper 2 is possible.

A stripper 35 (FIG. 18) each may be assigned to the opposing rollers 10, the edge thereof neighbouring the respective roller 10 is formed corresponding to the shape of the grooves, so that the stripper 35 meshes like a toothing with the projections 21 of the grooves 20 of the roller 10. If disposed obliquely and loaded with flour 36, these strippers 35 may also form a member of a flouring device for the grooved rollers 10.

Similar constructed strippers 35 are shown in the embodiment according to FIG. 19, wherein always a stripper 35 is related to one of the rollers 10 of each one of the roller sets 8 or 9. A drop oiler 37 is related to each one of the strippers 35, which applies oil dropwisely on the stripper 35, wherefrom the oil flows to the neighbouring roller 10. In such a manner oiling of the rollers 10 or, respectively, of the dough conducted by them, is possible.

Instead by means of strippers 35, oiling the dough can also be made by means of distributor rollers or brushes.

FIG. 2 shows an embodiment in which the supplied pre-formed dough strand 23 is dusted from above and from below, two dusting devices 38, 39 are provided for this. The dusting device 38 applies flour to the surface of the dough sheet 23, that lies already on the conveyor belt 3, whereas the dusting device 39 applies flour on the conveyor belt 3 already before the dough strip 23 is put onto the conveyor belt. In such a manner a dough strand 23 that is floured on both sides, flows on the intake end 16 of the gap 15 existing between the two roller sets 8, 9 into the gap in direction of the arrow 18. Putting-off of the dough strip 6 that has received the desired shape by the lowermost roller pair 10 is made continuously onto a continuously revolving conveying-off belt, which moves in direction of the arrow 40. By dusting the supplied dough sheet 23 on both sides, it is avoided that the soft dough adheres to the rollers 10.

In a similar manner, also an oiling device can be constructed instead of a dusting device.

The invention claimed is:

1. Apparatus for continuous producing of a dough strip (6), the width thereof is a multiple of its thickness, from a dough mass (5), with at least one pair of oppositely disposed elongated guiding elements (8, 9) for the dough, which guiding elements are formed by rollers (10) and are adjustably spaced apart from each other, wherein the dough passes through the gap (15) formed by this spacing, which gap (15) is delimited by the at least one pair of guidling elements, each guiding element having at least two rollers (10), so that the dough is guided by the rollers (10) driven in opposite direction of revolution from an intake end (16) of the apparatus to an outlet end (17) thereof, and wherein the width of the gap, when measured between oppositely disposed rollers (10), decreases from the intake end (16) towards the outlet end (17), and at least one of the rollers (10) is provided with a profile (19) on its periphery, which profile is formed by a plurality of grooves (20) extending side-by-side crosswise the longitudinal direction of the respective roller (10), which grooves enhance conveying the dough through the gap, characterized in that the rollers (10) of each roller set (8, 9) have a circumferential speed that increases in correspondence to narrowing of the gap towards the outlet end (17) and that the at least one roller is provided with the profile (19), so that the grooves (20) constitute an evading possibility for bubbles present in the dough (5), however keep the bubbles within the dough.

2. Apparatus according to claim 1, characterized in that the grooves (20) extend parallel to each other.

3. Apparatus according to claim 1, characterized in that the grooves (20) extend closed around the periphery of the roller (10).

4. Apparatus according to claim 3, characterized in that the grooves (20) extend perpendicularly to the longitudinal direction of the roller (10).

5. Apparatus according to claim 1, characterized in that the grooves (20) extend helically.

6. Apparatus according to claim 1, characterized in that slots (22) are provided in at least some of the projections (21) which exist between neighbouring grooves (20), the direction thereof crosses the direction of the grooves (20).

7. Apparatus according to claim 1, characterized in that the width of the gap (15) is adjustable only over a part of its length measured from the intake end (16) towards the outlet end (17).

8. Apparatus according to claim 1, characterized in that an eccentric drive (26) and/or at least one motor-driven adjustment device (29, 30) is provided for adjusting the width of the gap.

9. Apparatus according to claim 1, characterized in that the gap (15) extends obliquely or horizontally from the intake end (16) towards the outlet end (17).

10. Apparatus according to claim 1, characterized in that the rollers (10) have different profiles and/or different grooves and/or different sizes.

11. Apparatus according to claim 1, characterized in that the grooves (20) of the rollers (10) of the guiding elements (8, 9) neighbouring each other are offset with respect to each other.

12. Apparatus according to claim 11, characterized in that for rollers (10) neighbouring each other, the projections (21) defining the grooves (20) mate with each other.

13. Apparatus according to claim 1, characterized in that a stripper (35) is assigned to the at least one roller (10), which stripper constitutes a member of a device for flouring, dusting or oiling and preferably mates with the grooves (20) of the at least one roller (10).

14. Apparatus according to claim 1, characterized in that the at least one roller (10) constitutes a member of a device for flouring, dusting or oiling.

15. Apparatus according to claim 9, characterized in that a flow-out of the dough between rollers (10) neighbouring each other is avoided by the fact that the rollers (10) contact each other with their outermost peripheral parts.

* * * * *